Jan. 24, 1950     S. FOSTER     2,495,516
SIDE LOAD RELIEVING DEVICE FOR TELESCOPIC
PISTON AND CYLINDER UNITS
Filed Nov. 27, 1945     2 Sheets-Sheet 1

Inventor
Sidney Foster
by Stevens and Davis
his attorneys

Jan. 24, 1950 S. FOSTER 2,495,516
SIDE LOAD RELIEVING DEVICE FOR TELESCOPIC
PISTON AND CYLINDER UNITS
Filed Nov. 27, 1945 2 Sheets-Sheet 2

INVENTOR
*Sidney Foster*

BY *Stevens and Davis*
ATTORNEYS

Patented Jan. 24, 1950

2,495,516

UNITED STATES PATENT OFFICE 2,495,516

SIDE LOAD RELIEVING DEVICE FOR TELE-
SCOPIC PISTON AND CYLINDER UNITS

Sidney Foster, Leamington Spa, England

Application November 27, 1945, Serial No. 631,158
In Great Britain October 6, 1944

10 Claims. (Cl. 267—64)

This invention relates to bearing devices of the kind (hereinafter mentioned as the kind referred to) in which a bearing member having a substantially cylindrical operative surface cooperating slidably with a shaft or equivalent, is formed in said surface with a recess which is fed with liquid under pressure so that said liquid acts radially upon the shaft or equivalent and supports substantially the whole of the load, thus reducing the working friction as relative movement takes place between the bearing and the shaft or equivalent.

The invention is applicable to bearings for supporting a plunger or other member which slides in an axial direction in a guide, support, cylinder or like surrounding member, and which is or may be subjected to considerable loads in a direction making a large angle with the axis of the shaft or equivalent, such loads having a component perpendicular to the said axis, which component is hereinafter referred to as "side load."

The object of the invention is to provide a bearing in which friction due to the side load is kept very low, so that it does not interfere substantially with the sliding movement of the plunger or equivalent.

In a bearing device of the kind referred to, according to the invention, the bearing or equivalent is formed with a relief recess which is bounded by the plunger or equivalent and which has an outlet connection for the escape of working liquid, the relief recess being separated from the pressure recess by a bearing area which is substantially in engagement with the plunger when there is no pressure in the pressure recess, liquid fed to the pressure recess however acting to move the plunger or equivalent away from said bearing area, thus allowing liquid to escape from the pressure recess, across the said bearing area to the relief recess.

Preferably the pressure recess or cavity is separated from the relief recess at each side by a rib which extends longitudinally of the bearing member and is arranged to cooperate with the plunger or equivalent so as to prevent or substantially restrict the escape of liquid from the pressure recess. If desired the pressure recess may extend circumferentially through an angle substantially less than 180° and the relief recess through an angle substantially greater than 180°, the bearing member conveniently being provided with steadying means which project into the relief recess to keep the plunger or equivalent in its normal substantially centralised position. Usually the bearing member is tubular and is formed in one curved surface with the pressure and relief recesses, and in the other curved surface with a pair of circumferential grooves communicating respectively with the pressure and relief recesses by passages extending through the wall of the bearing member.

In one arrangement the pressure recess is completely surrounded by a groove or recess which has a free outlet and is formed in the operative surface of the bearing member, the surrounding groove or recess conveniently constituting part of the relief recess. The pressure recess may comprise a groove surrounding substantially completely an area of operative bearing surface on the bearing member, the arrangement being such that said surface supports the plunger or equivalent in the event of there being no pressure within the pressure recess.

If desired a pair of pressure recesses may be formed circumferentially end to end in the bearing member, said recesses being fed with pressure liquid through a pressure-sensitive valve device arranged to reduce, or shut off, the pressure supply to that recess which is worse sealed by the plunger or equivalent. The pressure sensitive valve device preferably comprises a pair of valves connected between a source of pressure liquid and the respective pressure recesses, each of said valves being opened by the pressure liquid from the source and being urged closed by the pressure in that pressure recess fed by the other pressure sensitive valve, the valve member of each of said pressure sensitive valves being balanced with respect to the pressure in its outlet.

The improved bearing device can advantageously be incorporated in a cylinder and piston or like telescopic reciprocatory mechanism so as to support side loads such as those due to bending moment, the bearing member being constituted or carried by the cylinder. Alternatively in a cylinder and piston mechanism the bearing device may be arranged in connection with the piston, the bearing member being constituted by the piston. Axial movements of the piston within the cylinder may create liquid pressure which is fed to the pressure recess for supporting side load. Where the piston is double acting, the pressure recess is preferably connected with both working spaces by a pair of non-return valves, and the relief recess is also connected with both working spaces by a pair of non-return valves, which latter are arranged in the reverse sense to the first-mentioned valves so that pressure liquid is fed to the pressure recess by piston movement in both directions, the relief recess being always free to discharge into that working space which is increasing in volume.

The invention is illustrated by way of example in the accompanying diagrammatic drawings in which.

Figure 1:
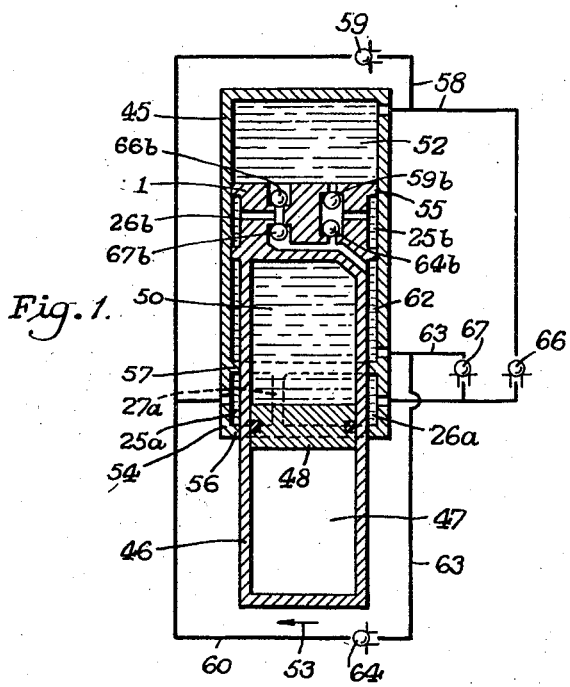
Figure 1 is a sectional elevation of a telescopic suspension device or strut incorporating bearing devices of the improved form.

The invention is described in conjunction with a pair of telescopically slidable members which are liable to be subjected to a bending moment, which would normally cause the parts to bind owing to the side load which occurs where the members engage one another. Thus Figure 1 shows diagrammatically a telescopic oleo-pneumatic suspension device such as is normally used in connection with the undercarriages of aircraft and the suspension systems of road vehicles. It comprises a cylinder 45 which would ordinarily be attached to the vehicle body or equivalent (not shown) and a plunger member 46 attached to the axle or equivalent (not shown) so as to rise and fall therewith. The plunger 46 is hollow so as to form a space 47 charged with compressed gas which latter is separated by a floating piston 48 from a plunger space 50 filled with working liquid. The upper part of the plunger 47 is provided with a piston head 51 which is slidable in a liquid-tight manner within the bore of the cylinder 45. The cylinder 45 is closed at its upper end so as to form a cylinder working space 52 which is also full of liquid, the piston head 51 usually being provided with a damping valve or constricted passage (not shown) adapted to allow liquid to flow backwards and forwards between the working spaces 50 and 52 as the plunger member 46 rises and falls, the resistance to the flow of liquid serving to damp the movements of the plunger member 46. It is assumed that during the normal operation of the device the plunger member 46 is acted upon at its lower end by a force towards the left as indicated by the arrow 53, thus subjecting the suspension device to a bending moment which forces the middle part of the plunger member 46 against the left hand side of the cylinder as indicated at 54 while the piston head 51 correspondingly has its right hand part 55 pressed sideways into engagement with the cylinder 45. To reduce the frictional drag caused by this bending moment, the lower end of the cylinder 45 is shaped to constitute a bearing of the form described above. That is, the cylinder has at its extremity an inwardly directed circumferential rib or flange 56 while it is formed a short distance up with a similar flange or rib 57, these being connected together by a pair of axially extending ribs one of which is shown in dotted lines at 27a. The circumferential ribs 56 and 57 and the axially extending ribs 27a together define an endless rib which provides a pressure recess 25a extending arcuately around the plunger member 46 to support the latter where it tends to be pressed against the cylinder 45; at the opposite side of the cylinder 45 a corresponding relief recess 26a is produced. During the operation of the suspension device considerable pressure alternations occur above the piston head 51 and in an annular working space 62 surrounding the plunger member 46. These alternations are utilised to produce a constant supply of pressure liquid which is fed to the pressure recess 25a. In order to secure this result a pipe 58 leads from the cylinder working space 52 through a non-return valve indicated at 59 and a pipe 60 to the pressure space 25a; the latter is also connected with the annular space 62 by a pipe 63, a non-return valve 64 and the pipe 60. The relief space 26a can discharge back into the liquid space of the suspension device by way of a pipe 65 and non-return valves 66 and 67 leading into pipes 58 and 63 respectively. The fit of the piston head 51 in the cylinder 45 is such that leakage at a restricted rate can take place between the spaces 62 and 52 as the pressure builds up in one or other of these spaces.

When the device is in operation upward movement of the plunger member 46 causes the pressure in the cylinder working space 52 to rise to a value considerably higher than that in the annular working space 62 so that the liquid flows from the working space 52 through the non-return valve 59 into the pressure recess 25a where it overcomes the side load and escapes into the relief recess 26a; from here the liquid can flow through the pipe 65 and the non-return valve 67 to the annular working space 62. During this upward movement pressure liquid from the cylinder working space 52 is, of course, prevented from flowing into the relief recess 26a owing to the provision of the non-return valve 66. A similar action occurs during the downward stroke of the plunger member 46, the pressure in the cylinder working space 52 falling to a value which is substantially lower than that in the annular working space 62. Therefore, liquid from the space 62 flows through the non-return valve 64 into the pressure space 25a while excess liquid from the relief recess 26a passes through the non-return valve 66 and pipe 58 into the cylinder working space 52. In this way pressure is constantly maintained within the pressure recess 25a and automatically acts upon the plunger member 46 with a force which is just sufficient to overcome the side load.

A similar arrangement is provided for the piston head 51, the latter being provided with ribs around its periphery to form a pressure recess 25b on its right hand side and a relief recess 26b on its left hand side. The pressure recess 25b receives liquid from the working spaces 52 and 62 by non-return valves 59b and 64b respectively, these being fitted in the piston head 51 and being of course normally urged to their seats by compression springs (not shown); similarly the relief recess 26b connects alternately with the two working spaces by non-return valves 66b and 67b respectively. In practice fluid-tight packing means would be provided around the bottom of the cylinder 45 to prevent leakage along the outside of the plunger member 46 but such packing is not shown in the drawings.

Figures 2, 2A:
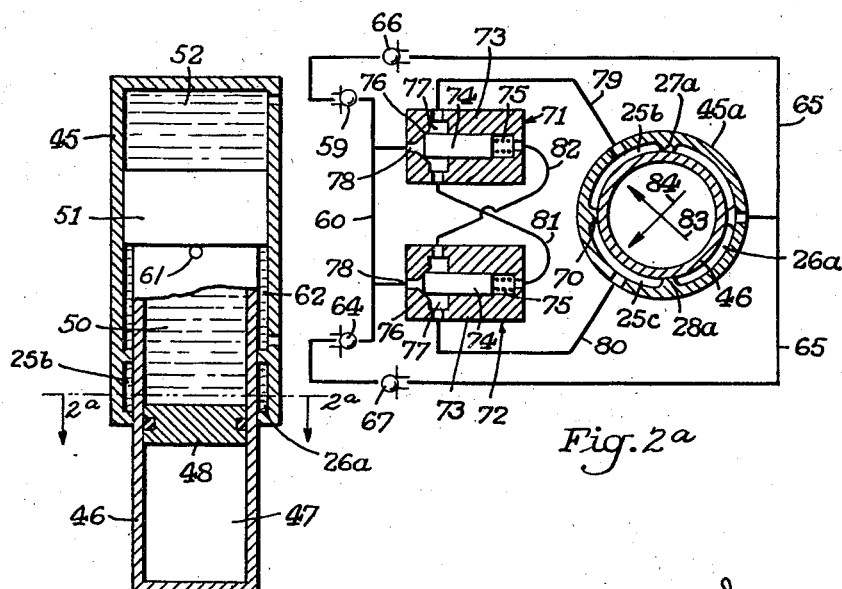
Figure 2 is a view in vertical section of a modified form of bearing as applied to the cylinder of a telescopic strut.
Figure 2a is a view partially along the section line 2a—2a of Figure 2 and partially concerned with a fluid circuit diagram.

In some applications of the invention the direction of the side load is liable to vary from time to time and it may be desirable to arrange the pressure recess so that it compensates automatically to some extent for such variation. One system enabling this result to be obtained is shown in Figure 2, the invention being applied to the lower end of the cylinder 45 of a telescopic suspension device of the general form which has been already described in connection with Figure 1. It will be seen that the device comprises briefly a plunger 46 having a piston head 51 at its upper end, said piston head being arranged to create alternations of pressure in the cylinder working space 52 and the plunger working space 50 as the plunger number 46 moves up and down within the cylinder 45. The plunger working space 50 is in permanent communication with an annular space 62 through ports, one of which is seen at 61, thus enabling an external connection to be made readily to the plunger working space 50. It is again assumed that the plunger 46 is subjected at its lower end to a force 53 tending to move its lower end towards the right; the plane of this movement is however not necessarily in the plane of the drawing. For this reason the lower end of the cylinder 45 is arranged as indicated at 45a at the right hand side of Figure 2, this being a diagrammatic representation of a sectional plan taken on the line 2—2. The right hand side of the cylinder 45 is formed with a relief recess 26a but on the left hand side there are two pressure recesses arranged circumferentially end to end and indicated at 25b and 25c. A rib 70 is provided between them for engagement with the plunger member 46 while ribs 27a and 28a normally separate the pressure recesses 25b and 25c from the relief recess 26a. The relief recess 26a is connected by a pipe 65 with the cylinder working space 52 by way of a non-return valve 66 and with the plunger working space 50 by way of a non-return valve 67. A supply of pressure liquid is similarly derived from the working spaces through non-return valves 59 and 64 which feed alternately into a pipe 60. The delivery from this pipe 60 to the pressure recesses 25b and 25c is selectively distributed in a manner which is automatically governed by the direction of the side load on the plunger member 46 and for this purpose a pair of pressure-sensitive valve devices 71 and 72 are provided. Each of these comprises a body 73 having a longitudinal bore within which a valve member 74 in the form of a cylindrical block is slidable. The right hand end of the bore constitutes a working space 75 within which pressure liquid can act to force the valve member 74 towards the left so that its end closes a seating 76; the valve member is normally urged into engagement with this seating by a coiled compression spring within the working space 75. The left hand end of the valve member 74 is disposed within an outlet chamber 77 and it will be seen that owing to the cylindrical nature of the valve member 74, the latter is balanced as far as pressure in the outlet chamber 77 is concerned, that is when the valve member 74 is in its closed position. The pressure inlet connection 78 of each of the valves 71 and 72 is connected to the pressure supply pipe 60 while the outlet chamber 77 of the valve 71 is connected with the pressure recess 25b by a pipe 79 and the corresponding outlet of the valve 72 is connected by a pipe 80 with the second pressure recess 25c. The outlet chamber 77 of the valve 71 is moreover connected by a pipe 81 with the working space 75 of the valve 72 while in a similar manner a pipe 82 connects the outlet chamber 77 of the valve 72 with the working space 75 of the valve 71.

In operation the position of each of the valve members 74 is determined by the difference of the liquid pressures in the inlet connection 78 and the corresponding working space 75; if these pressures are equal, the valve member 74 is urged to the left by the coiled spring, thus closing the valve, but when the pressure in the working space 75 is low the valve member is moved to the right by the pressure in the inlet 78, thus allowing the liquid to flow to the outlet chamber 77. As mentioned above, when the valve is closed the pressure in the outlet chamber 77 has no tendency to move the valve member 74 in either direction. Let it be assumed that the side load on the plunger member is acting in a "north-westerly" direction as seen at the right hand side of Figure 2a, i. e. in the direction of the arrow 83. This means that the plunger member will seat firmly upon the ribs 27a and 70 and will tend to leave a clearance space at the rib 28a. If therefore equal quantities of pressure liquid are fed to the two pressure recesses 25b and 25c, the pressure in the recess 25c would be substantially lower than that in the recess 25b owing to the leakage which would occur across the rib 28a; this effect would be accentuated by the fact that the force exerted upon the plunger member 46 by the liquid in the recess 25b is directly opposed by the side load on the plunger, whereas liquid in the recess 25c can readily press the plunger member sideways away from the rib 28a to the requisite small extent to permit relatively free leakage. In other words, under these conditions the recess 25c is sealed by the plunger 46 worse than is the recess 25b.

The pressure-sensitive valves 71 and 72 operate as follows. Let it still be assumed that the side load is acting in the direction of the arrow 83. When pressure liquid is first fed to the supply pipe 60 it flows into both inlet connections 78, pushes back both valve members 74 and flows along the pipes 79 and 80 to the two pressure recesses 25b and 25c respectively. The pressure in the recess 25b is communicated by the pipe 81 to the working space 75 of the valve 72 and thus tends to close the said valve which feeds the recess 25c; similarly the pressure in the recess 25c acts to close the valve 71 feeding the recess 25b. Owing to the side load, the higher pressure which is built up in the recess 25b shuts off partially or completely the flow of pressure liquid through the valve 72 to the recess 25c. A limited flow of liquid to the said recess 25c may be desirable so as to ensure that a pressure will be built up in the recess 25c in the event of the direction of side load changing to or towards the "south-westerly" direction indicated by the arrow 84. In that case the pressure in the recess 25c would act to close the valve 71 and thus shut off or reduce the flow of liquid to the recess 25b.

Figure 3:
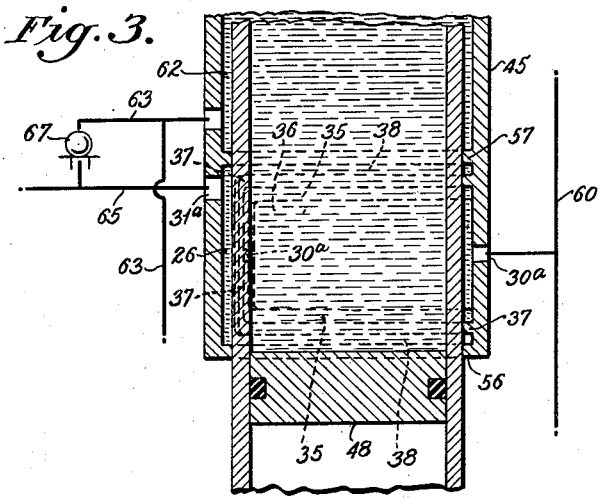
Figure 3 is a view in vertical section to an enlarged scale of a portion of a telescopic suspension device of the type shown in Figure 1 and shows a modified form of bearing.
Figure 4:
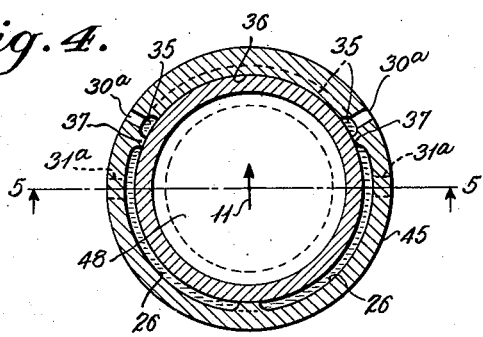
Figure 4 is a view in cross section taken through the bearing of Figure 3 in a plane normal to the long axis of the suspension device.
Figure 5:
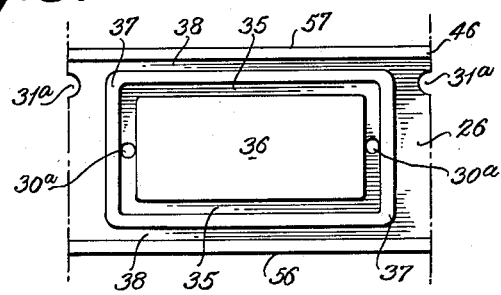
Figure 5 is a developed view of the bearing of Figure 4 taken between the radii 5—5 of Figure 4.

The modified construction of bearing member shown in Figures 3, 4 and 5 is again tubular in shape to surround the piston and is formed internally in one sector with relief cavities 26 connected externally to the reservoir (not shown) by way of passages 31a. In its other sector bearing member has internally a substantial area of surface which fits against the piston and which is indicated at 36 in Figure 5. Thus the internal surface of the bearing member has an endless groove 35 of substantially rectangular shape surrounding a "plateau" or land 36 constituting a relatively large bearing area. The groove 35 is arranged to be fed with pressure liquid through a pair of radial inlet passages 30a and it is bounded on its outside by an endless rectangular rib 37 serving to separate it from the relief cavities 26. The relief cavities are continued around the rib 37 by the provision of circumferential grooves 38 which are defined between the horizontal portions of the rib 37 and endless circumferential ribs 56 and 57. When liquid pressure is absent or is insufficient to overcome side load of the piston, the latter is efficiently supported by the relatively large bearing area constituted by the land 36, the rectangular rib 37 and the lower parts of the ribs 51. To reduce friction during operation, however, pressure liquid is forced into the groove 35 and naturally spreads completely across the land 36 so that the liquid pressure acts at its full value across the whole area of the rectangle defined by the groove 35. When the force exerted by this liquid is able to assume the load imposed by the piston, it leaks across rib 37 into the groove 38 and the relief cavity 26 thus limiting the pressure of the liquid and at the same time providing a film of liquid between the plunger 46 and the bearing surface 36, 37 to reduce running friction. As the grooves 38 and relief cavities 26 are in free communication with the reservoir it follows that the ribs 51 are not subjected to any substantial liquid pressure and therefore it is unnecessary to provide pressure-tight packing means with this form of device.

It will be understood that the arrangements which have been described are given merely by way of example and that the improved form of bearing device is applicable in various modified ways.

What I claim is:

1. A telescopic device comprising piston and cylinder elements, in which that surface of one of the elements, engaging slidably with the other element, is formed with a pressure recess at that side where the radial load is greatest, a relief recess at that side where the radial load is least, and a pair of axially extending ribs separating the pressure recess from the relief recess, said device also comprising means for forcing fluid under pressure into the pressure recess and an exhaust outlet from the relief recess whereby pressure fluid which escapes across the axially extending ribs can flow freely away through the relief recess.

2. A telescopic device as claimed in claim 1, in which said one element is the cylinder and that surface thereof slidably engaging the piston element, has a pair of circumferential ribs which connect together the corresponding ends of the axially extending ribs, the whole forming an endless rib completely surrounding the pressure recess.

3. A telescopic device as claimed in claim 2, in which the cylinder element is formed with a land disposed inside the area bounded by the endless rib, said land being arranged to engage slidably with, and form a bearing surface for the piston element when the fluid pressure within the pressure recess is insufficient to overcome the radial load.

4. A telescopic device comprising piston and cylinder elements, in which that surface of the cylinder element, engaging slidably with the piston, is formed with a pressure recess at one side, a relief recess at the opposite side, an endless rib of rectangular shape enclosing the pressure recess and engaging slidably with the piston element, and a pair of circumferential ribs extending completely around the cylinder element to define the relief recess, said circumferential ribs being spaced axially from the endless rib so that the relief recess is extended completely around the pressure recess, said device also comprising means for forcing fluid under pressure into the pressure recess and an exhaust outlet from the relief recess whereby the pressure fluid which escapes across the endless rib can flow freely away through the relief recess.

5. A telescopic device as claimed in claim 1, in which said one element is the piston and in which a working space is defined between the piston and cylinder, further comprising means connecting said working space with the pressure recess whereby axial movement of the piston element relative to the cylinder element generates fluid pressure in said working space, and feeds pressure fluid to the pressure recess.

6. In a telescopic device comprising piston and cylinder elements, a bearing on the cylinder element to support radial load, comprising a land forming a bearing surface engaging slidably with the piston element, an endless rib surrounding said land and spaced therefrom by a groove constituting a pressure recess, the outside of the endless rib forming the boundary of a relief recess, means for feeding fluid under pressure into the pressure recess, whereby the pressure fluid spreads across the said land and supports the radial load, and an outlet from the relief recess allowing fluid to escape after it has passed out of the pressure recess and across the endless rib.

7. A telescopic shock-absorbing suspension device comprising a cylinder, a double-acting piston slidable therein and dividing the interior of the cylinder into two working spaces, a pressure recess in one side of the piston where it engages slidably with the cylinder, a relief recess in the diametrically opposite side of said piston and non-return valve means connecting the working spaces of the cylinder to the pressure and relief recesses so that, as the piston reciprocates, fluid from said spaces can pass to the pressure recess but not to the relief recess, and fluid can flow from the relief recess to said working spaces, but not in the opposite direction into the relief recess.

8. A telescopic shock-absorbing suspension device comprising a cylinder, a double-acting piston slidable therein and dividing the interior of the cylinder into two working spaces, a plunger slidable as one with the piston and having a cylindrical external surface, an annular bearing slidably engaging said plunger, a pressure recess in one side of the bearing where it engages slidably with the plunger, a relief recess in the diametrically opposite side of said bearing, and non-return valve means connecting the working spaces of the cylinder to the pressure and relief recesses so that as the piston reciprocates fluid from said spaces can pass to the pressure recess but not to the relief recess, and fluid can flow from the relief recess to said working spaces, but not in the opposite direction into the relief recess.

9. A telescopic device comprising piston and cylinder elements, in which that surface of the piston element, engaging slidably with the cylinder element, is formed with a pair of pressure recesses disposed side by side at that part of the circumference where the radial load preponderates, an axially extending rib separating said pressure recesses, a relief recess in that side where the radial load is least, a pair of axially extending ribs separating the pressure recesses from the relief recess, said device also comprising means for forcing fluid under pressure into the pressure recesses, an exhaust outlet from the relief recess whereby the pressure fluid which escapes across the longitudinal ribs can flow freely away through the relief recess, and a pressure-sensitive valve device arranged to reduce, or shut off, the pressure supply to that pressure recess which is worse sealed by the cylinder element.

10. A telescopic device as claimed in claim 9, wherein the pressure-sensitive valve device comprises a pair of valves connected between the source of pressure liquid and the respective pressure recesses, each of said valves being opened by the pressure liquid from the source and being urged closed by the pressure in that pressure recess fed by the other pressure-sensitive valve.

SIDNEY FOSTER.

REFERENCES CITED

The following references are of record in the file of this patent:

UNITED STATES PATENTS

| Number | Name | Date |
|---|---|---|
| 466,645 | Wood | Jan. 5, 1892 |
| 603,260 | Cook | May 3, 1898 |
| 2,049,343 | Warren | July 28, 1936 |
| 2,344,571 | Turrettini | Mar. 21, 1944 |